(12) United States Patent
Kodaira et al.

(10) Patent No.: US 11,074,003 B2
(45) Date of Patent: Jul. 27, 2021

(54) STORAGE SYSTEM AND RESTORATION METHOD

(71) Applicant: Hitachi, Ltd., Tokyo (JP)

(72) Inventors: Ryosuke Kodaira, Tokyo (JP); Naoyuki Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/793,079

(22) Filed: Feb. 18, 2020

(65) Prior Publication Data
US 2021/0064244 A1    Mar. 4, 2021

(30) Foreign Application Priority Data
Aug. 26, 2019  (JP) .............................. JP2019-153567

(51) Int. Cl.
*G06F 3/06*    (2006.01)
(52) U.S. Cl.
CPC ............ *G06F 3/065* (2013.01); *G06F 3/0619* (2013.01); *G06F 3/0673* (2013.01)
(58) Field of Classification Search
None
See application file for complete search history.

(56) References Cited

U.S. PATENT DOCUMENTS

| 9,672,113 B1* | 6/2017 | Rodriques | G06F 11/1448 |
| 2007/0277012 A1* | 11/2007 | Hara | G06F 12/00 |
| | | | 711/162 |
| 2008/0059734 A1 | 3/2008 | Mizuno | |
| 2009/0013012 A1* | 1/2009 | Ichikawa | G06F 11/1464 |

FOREIGN PATENT DOCUMENTS

JP    2008-65503 A    3/2008

* cited by examiner

*Primary Examiner* — Prasith Thammavong
*Assistant Examiner* — Edmund H Kwong
(74) *Attorney, Agent, or Firm* — Mattingly & Malur, PC

(57) ABSTRACT

A storage controller configures a plurality of logical volumes, a CDP meta volume that manages history information related to writing from a server system for the logical volumes, and a CDP data volume that stores data of the plurality of logical volumes. The storage controller searches for, if a restoration request including a restoration time is received, the restoration request having one of the plurality of volumes as a restoration target volume, history information of the restoration target volume from the CDP meta volume, copies, in a case in which an evacuation time of old data included in the searched history information of the restoration target volume is newer than the restoration time, an SEQ number of the searched history information as first restoration control information, and acquires old history information on the basis of a previous SEQ number of the restoration target volume from the CDP meta volume.

8 Claims, 15 Drawing Sheets

FIG. 5

JNL DATA MANAGEMENT INFORMATION 401

| SEQ# | EVACUATION TIME | CDP VOL# | PREVIOUS SEQ# OF SAME CDP VOL |
|---|---|---|---|
| 0 | t0 | A | INVALID VALUE |
| 1 | t1 | B | INVALID VALUE |
| 2 | t2 | C | INVALID VALUE |
| 3 | t3 | C | 2 |
| 4 | t4 | C | 3 |
| 5 | t5 | A | 0 |
| 6 | t6 | B | 1 |
| 7 | t7 | A | 5 |
| 8 | t8 | B | 6 |
| 9 | t9 | A | 7 |

RESTORATION CONTROL INFORMATION 404

| CDP-VOL A (301a) ||  CDP-VOL B (301b) || CDP-VOL C (301c) ||
| SEQ# (804) | EVACUATION TIME (805) | SEQ# | EVACUATION TIME | SEQ# | EVACUATION TIME |
| --- | --- | --- | --- | --- | --- |
| 5 | t5 | 6 | t6 | 4 | t4 |

STORAGE SYSTEM AND RESTORATION METHOD

CROSS-REFERENCE TO RELATED APPLICATION

The present application claims priority from Japanese application JP2019-153567, filed on Aug. 26, 2019, the contents of which is hereby incorporated by reference into this application.

BACKGROUND OF THE INVENTION

1. Field of the Invention

The present invention relates to a restoration technique using a journal of a storage system.

2. Description of the Related Art

In a case in which data is lost due to the occurrence of a failure in a storage system, a human mistake, or data falsification by ransomware, or the like, it is necessary to promptly restore to a normal state.

Continuous data protection (CDP) is a technique that can restore to any designated past time point (recovery point) (JP 2008-65503 A). In the CDP, during a write process to a production volume in which business data is stored, data before update is evacuated and history information is stored continuously. If a failure or the like is detected, the recovery point serving as a data restoration time point is designated, and a restoration process using the evacuated data is performed.

In the CDP, during the write process to the production volume in which the business data is stored, data before update is evacuated, the history information (also referred to as a journal) is continuously stored, and in order to return data to the time point of the recovery point, the journal is sequentially written in the production volume, so that the state of the time point of the recovery point is restored.

Therefore, if there is a lot of writing in the production volume from the recovery point to the present, many journals have to be applied to the production volume, and a restoration time is required. In particular, in an environment in which a plurality of production volumes are collectively managed as a CDP group, the number of production volumes increases, and thus many journals have to be processed for restoration accordingly.

SUMMARY OF THE INVENTION

It is an object of the present invention to provide a storage system capable of reducing a restoration processing time in the CDP.

In order to achieve the above object, one aspect of a storage system of the present invention is a storage system that includes a storage device and a storage controller and provides a plurality of logical volumes configured with the storage device to a server system through the storage controller, and the storage controller configures a CDP meta volume that manages history information related to writing from the server system for the plurality of logical volumes and a CDP data volume that stores data of the plurality of logical volumes. The storage controller searches for, if a restoration request including a restoration time is received, the restoration request having one of the plurality of volumes as a restoration target volume, history information of the restoration target volume from the CDP meta volume, and copies, in a case in which an evacuation time of old data included in the searched history information of the restoration target volume is newer than the restoration time, an SEQ number of the searched history information as first restoration control information. The storage controller acquires old history information on the basis of a previous SEQ number of the restoration target volume from the CDP meta volume and copies, in a case in which an evacuation time of the old history information is older than the restoration time, an SEQ number of the old history information as second restoration control information. Then, the storage controller performs a restoration process of the restoration target volume on the basis of the second restoration control information.

According to the present invention, the restoration processing time can be reduced.

BRIEF DESCRIPTION OF THE DRAWINGS

FIG. 5 is a diagram illustrating JNL data management information;

FIG. 8 is a diagram illustrating restoration control information;

DETAILED DESCRIPTION OF THE PREFERRED EMBODIMENTS

Figure 1:
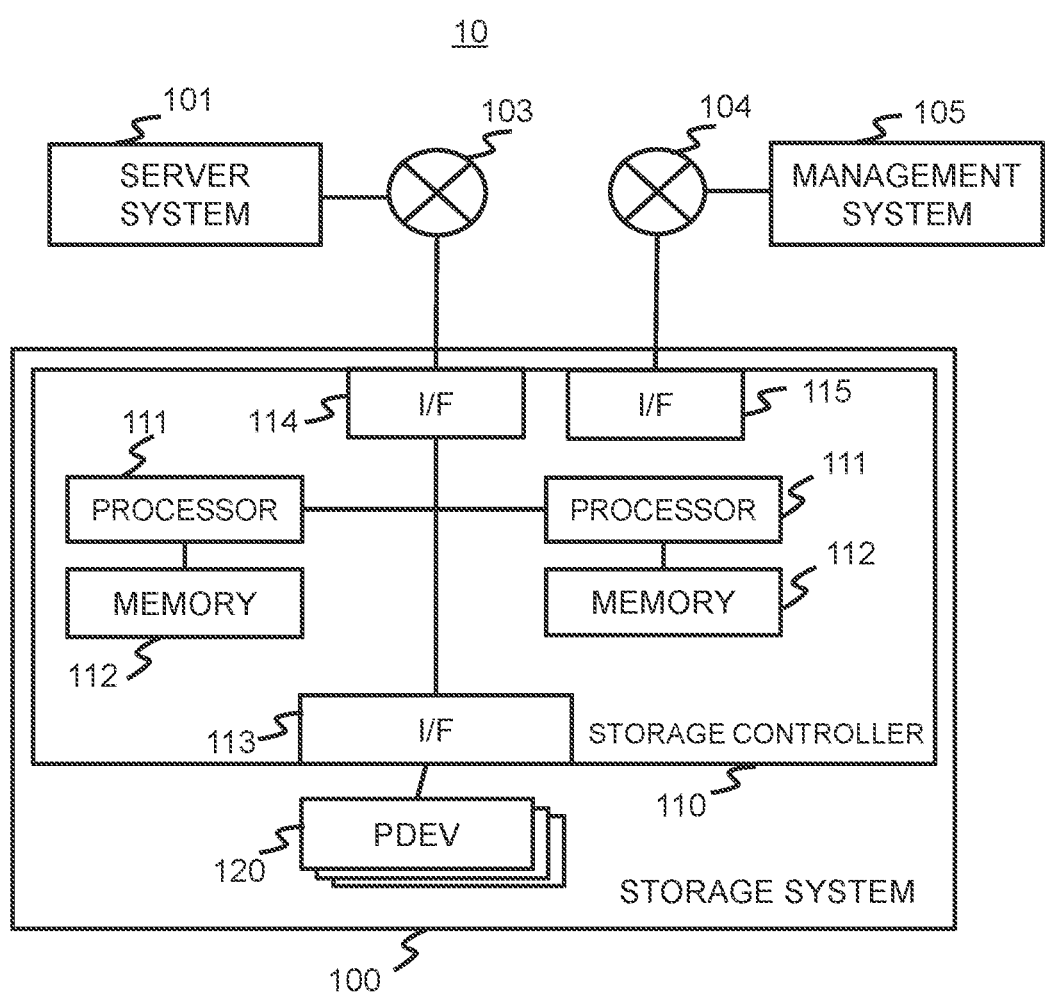
FIG. 1 is a diagram illustrating a configuration example of a system including a storage system.

In the following description, an "interface unit" may be one or more interfaces. One or more interfaces may be the same type of one or more communication interface devices (for example, one or more network interface cards (NICs)) or may be different types of two or more communication interface devices (for example, NICs and host bus adapters (HBAs)).

Further, in the following description, a "memory unit" is one or more memories and may typically be a main storage device. At least one memory in the memory unit may be a volatile memory or may be a non-volatile memory.

Further, in the following description, a "PDEV unit" is one or more PDEVs and may typically be an auxiliary storage device. "PDEV" stands for a physical storage device and is typically a non-volatile storage device, for example, a hard disk drive (HDD) or a solid state drive (SSD). Alternatively, it may be a flash package.

A flash package is a storage device including a non-volatile storage medium. A configuration example of the flash package includes a controller and a flash memory which is a storage medium for storing write data from a computer system. The controller includes a drive I/F, a processor, a memory, a flash I/F, and a logic circuit having a compression function, and these components are connected to one another via an internal network. A compression function may not be provided.

In the following description, a "storage unit" is at least one of a memory unit and a PDEV unit (typically, at least a memory unit).

In the following description, a "processor section" is one or more processors. At least one processor is typically a microprocessor such as a central processing unit (CPU) but may be other types of processors such as a graphics processing unit (GPU). At least one processor may be a single-core processor or may be a multi-core processor.

Further, at least one processor in the broad sense of the term may be a processor such as a hardware circuit (for example, a field-programmable gate array (FPGA) or an application specific integrated circuit (ASIC)) that performs a part or all of a process.

In the following description, information such as "xxx table" may be used to describe information for which an output is obtained for an input, but the information may be data of a certain structure or may be a learning model such as neural network that generate an output in response to an input. Therefore, "xxx table" can be called "xxx information."

Also, in the following description, a configuration of each table is an example, and one table may be divided into two or more tables, or all or some of two or more tables may be one table.

Also, in the following description, there are cases in which a process is described using a "program" as a subject, but since a predetermined process is performed using a storage unit, an interface unit, and/or the like appropriately as the program is executed by a processing unit, the subject of the process may be a processor unit (or a device such as a controller including a processor unit).

The program may be installed in a device such as a computer and may be, for example, a (for example, non-transitory) recording medium which is readable by a program distribution server or a computer. In the following description, two or more programs may be realized as one program, or one program may be realized as two or more programs.

In the following description, a "computer system" is a system including one or more physical computers. The physical computer may be a general-purpose computer or a dedicated computer. The physical computer may function as a computer (for example, referred to as a host computer or a server system) that issues an input/output (IO) request or may function as a computer (for example, a storage device) that performs data I/O in response to the I/O request.

In other words, the computer system may be at least one of one or more server systems that issue the I/O request and a storage system which are one or more storage devices that perform the data I/O in response to the I/O requests. One or more virtual computers (for example, virtual machines (VMs)) may be executed in at least one physical computer. The virtual computer may be a computer that issues an I/O request or a computer that performs data I/O in response to an I/O request.

Also, the computer system may be a distributed system configured with one or more (typically, multiple) physical node devices. The physical loading device is a physical computer.

Also, as a physical computer (for example, a node device) executes predetermined software, a software-defined anything (SDx) may be constructed in the physical computer or in a computer system including the physical computer. For example, a software defined storage (SDS) or a software-defined datacenter (SDDC) may be adopted as the SDx.

For example, a storage system serving as the SDS may be constructed by executing software having a storage function through a general-purpose physical computer.

Also, one or more virtual computers serving as a server system and a virtual computer serving as a storage controller of a storage system (typically, a device that inputs and outputs data to a PDEV unit in response to an I/O request) may be executed by at least one physical computer (for example, a storage device).

In other words, at least one physical computer may have both a function of at least a part of a server system and a function of at least a part of a storage system.

Also, a computer system (typically, a storage system) may have a redundant configuration group. The redundant configuration may be a configuration including a plurality of node devices such as erasure coding, redundant array of independent nodes (RAIN), and inter-node mirroring or may be a configuration with a single computer such as one or more redundant array of independent (or inexpensive) disks (RAIDs) serving as at least a part of a PDEV unit.

Further, in the following description, an identification number is used as identification information of various kinds of objects, but identification information of a type other than the identification number (for example, an identifier including an alphabet letter or a code) may be employed.

Further, in the following description, a reference numeral (or a common numeral among reference numerals) may be used in a case in which the description proceeds without distinguishing the same type of elements, and identification numbers (reference numerals) of elements may be used in a case in which the description proceeds while distinguishing the same type of elements.

First Embodiment

<Operation Overview>

Hereinafter, a first embodiment will be described with reference to the appended drawings.

<System Configuration>

A storage system 100 includes a storage controller 110 as illustrated in FIG. 1. The storage controller 110 is an example of a controller including a processor 111. The storage system 100 includes a PDEV 120 which is a storage device configured with a plurality (or one) of physical storage devices and the storage controller 110 connected to the PDEV 120.

The storage controller 110 includes an I/F 114, an I/F 115, an I/F 113, a memory 112, and a processor 111 connected thereto. The I/F 114, the I/F 115, and the I/F 113 are examples of an interface unit. The memory 112 is an example of a storage unit. The processor 111 is an example of a processor part.

The I/F 114 is a communication interface device that mediates data exchange between a server system 101 and the storage controller 110. The server system 101 is connected to the I/F 114 via a fibre channel (FC) network 103.

The server system 101 transmits an I/O request (a write request or a read request) designating an I/O destination (for example, a logical volume number such as a logical unit number (LUN) or a logical address such as a logical block address (LBA)) to the storage controller 110.

The I/F 115 is a communication interface device that mediates data exchange between a management system 105 and the storage controller 110. The management system 105 is connected to the I/F 115 via an Internet protocol (IP) network 104.

The network 103 and the network 104 may be the same communication network. The management system 105 manages the storage system 100.

The I/F 113 is a communication interface device that mediates data exchange between a plurality of PDEVs 120 and the storage controller 110. A plurality of PDEVs 120 are connected to the I/F 113.

The memory 112 is configured with, for example, a semiconductor memory such as a synchronous dynamic random access memory (SDRAM), and stores a program executed by the processor 111 and data used by the processor 111. The processor 111 executes the program stored in the memory 112. For example, a set of the memory 112 and the processor 111 is duplicated.

As described above, the PDEV 120 is one or more PDEVs and may typically be an auxiliary storage device. "PDEV" stands for a physical storage device which is a storage device, and is typically a non-volatile storage device, for example, a hard disk drive (HDD) or a solid state drive (SSD). Alternatively, it may be a flash package.

There are several techniques for backing up original data in case data is preparation for situations in which data is lost due to the occurrence of a failure in a storage system, a human mistake, or data falsification by ransomware or the like.

As one of the backup techniques, known a continuous data protection (CDP) technique capable of restoring original data of an arbitrary time point for a certain limited period. A general CDP technique will be described. In the CDP, when original data is updated, information (hereinafter, a journal) indicating a history related to the update of the original data is acquired, and the journal is stored in a storage area (for example, a logical volume such as a journal volume "JVOL" or a history information volume for storing history information related to update of a primary volume) separate from a storage area in which the original data is stored (for example, a primary logical volume which is hereinafter referred to as a journal volume "JVOL").

In a case in which a data restoration request (restoration request) designating an arbitrary time point (hereinafter referred to as a restoration time) is received, a journal corresponding to write data to the PVOL is reflected in the PVOL, and the PVOL is restored to data of the restoration time. It takes a lot of time in a process of reflecting the journal in the PVOL, but in a first embodiment, the restoration process is sped up by reflecting a journal immediately before the restoration time without reflecting all the journals. More specifically, in a case in which there are a plurality of write requests to the same logical address of the PVOL, the restoration process is sped up by reflecting data written immediately before the restoration time in the journal acquired from the latest PVOL until the restoration time.

Note that, although the CDP operation of reflecting the journal in the PVOL has been described as an explanation of the restoration process, it can also be applied to a CDP in which the original data is restored at the restoration time (that is, base data is updated to the original data at the restoration time) in the BVOL by reflecting the journal acquired from a BVOL creation time (a base data acquisition time) to the restoration time in the BVOL. In this case, the base data before the journal is acquired is created and stored in a storage area (for example, a base volume "BVOL" or a copy volume for storing a copy of the primary volume) separate from the storage area in which the original data or the journal is stored. The restoration process can be performed by reflecting the journal in the BVOL. In the first embodiment, the description will proceed on the premise of the restoration process by reflecting the journal in the PVOL.

The description will proceed using elements required for the CDP technique, but it is not essential for the invention. For example, it is not essential that the BVOL or the JVOL is provided. It is desirable that information to return to a certain time point in the past be provided. For example, it is desirable that history information including past write time, a write address, and write data and data stored in a current volume are provided.

Figure 2:
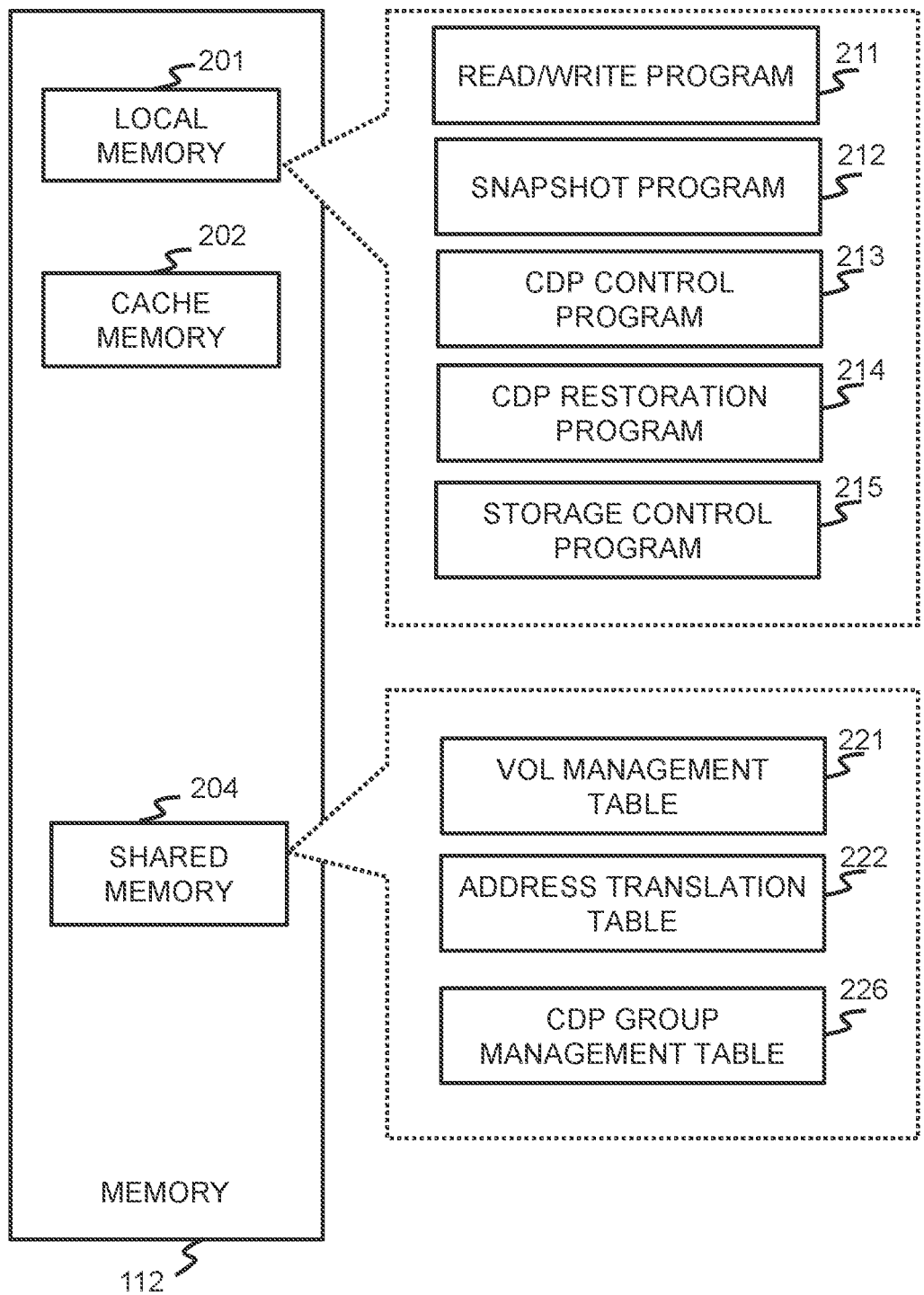
FIG. 2 is a diagram illustrating an example of a configuration of a memory and a program and management information in the memory.

FIG. 2 is a diagram illustrating an example of a configuration of the memory 112 and the program and management information in the memory 112. The memory 112 includes memory areas such as a local memory 201, a cache memory 202, and a shared memory 204. At least one of these memory areas may be an independent memory. The local memory 201 is used by the processor 111 belonging to the same group as the memory 112 including the local memory 201.

A read/write program 211, a snapshot program 212, a CDP control program 213, and a CDP restoration program 214 and a storage control program 215 are stored in the local memory 201.

The storage control program 215 provides a PVOL serving as a production volume to the server system 101. The PVOL may be configured with a plurality of node devices such as erasure coding, a redundant array of independent nodes (RAIN), and inter-node mirroring and is a logical volume configured with one or more redundant array of independent (or inexpensive) disks (RAID) groups serving as at least a part of a PDEV unit.

The read/write program 211 is a program that processes an I/O request (a write request or a read request) designating an I/O destination (for example, a logical volume number of a logical volume (PVOL) serving as a logical unit number (LUN) or a logical address such as a Logical Block Address (LBA)) from the server system 101 to the storage controller 110 and writes write data from the server system 101 to the PVOL or reads data from the PVOL.

The snapshot program 212 is a program that periodically acquires a PVOL snapshot. The PVOL snapshot can also be acquired from the management system 105 in accordance with an administrator's instruction.

The CDP control program 213 is a program that creates a journal serving as history information in accordance with the write process to the PVOL and stores it in an area different from the PVOL.

The CDP restoration program 214 is a program for receiving the restoration request for restoring data at an arbitrary past time point (the restoration time) of a restoration target PVOL and restoring data of the restoration time using the journal.

The CDP control program 213 and the CDP restoration program 214 will be described later.

The cache memory 202 temporarily stores a data set written or read to or from the PDEV 120.

The shared memory 204 is used by both the processor 111 belonging to the same set as the memory 112 including the shared memory 204 and the processor 111 belonging to a different set. The management information is stored in the shared memory 204.

The management information includes a VOL management table 221, an address translation table 222, and a CDP group management table 226.

The VOL management table 221 manages a correspondence relation of a CDP group 303 configured with a CDP volume 301 and a CDP meta volume 302, a CDP data volume 305, a CDP data volume group, a DP pool 306, and the like.

The address translation table 222 manages a correspondence relation of a logical address of the CDP volume 301 and a storage position of the CDP data volume 305 in which actual user data is stored and a correspondence relation of the write data of the CDP volume and the journal of the CDP meta volume 302.

The CDP group management table 226 manages a correspondence relation of a plurality of CDP volumes and the CDP group.

Figure 3:
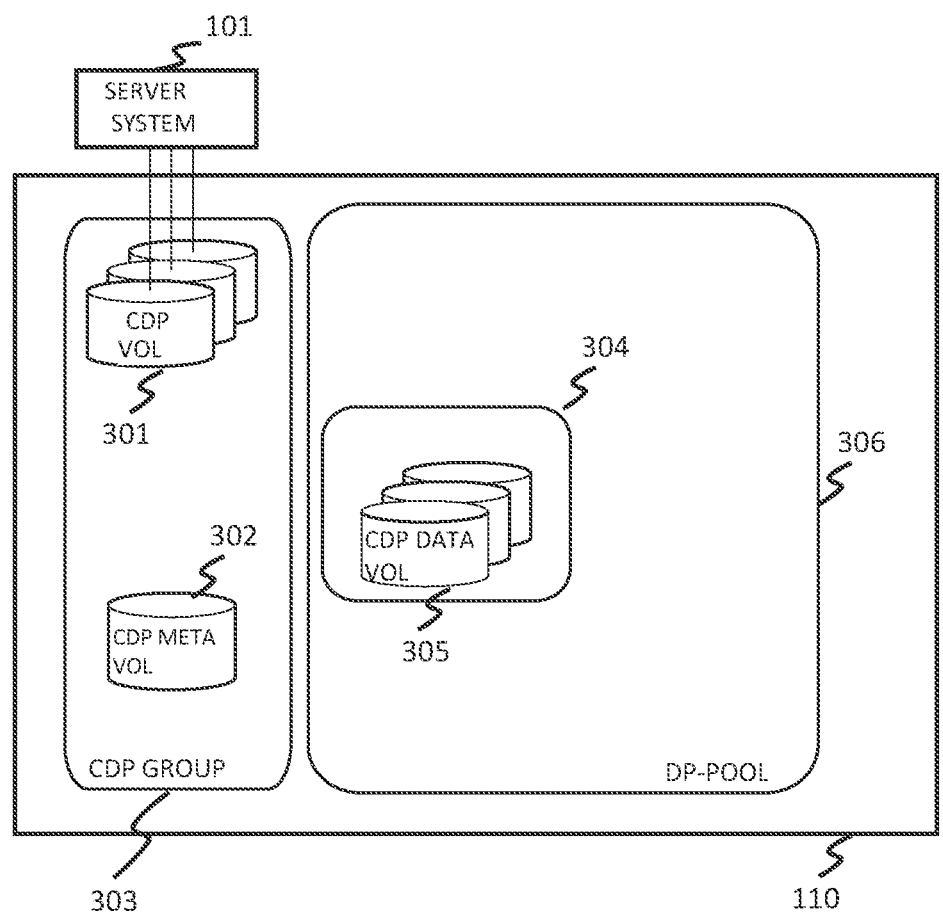
FIG. 3 is an explanatory diagram of each volume of a storage system.

FIG. 3 illustrates various kinds of volumes configured with the CDP control program 213 of the storage controller 110. Various kinds of volumes are generated by virtualizing the physical storage area of the PDEV 120. The CDP volume 301 is a volume in which the CDP function is set in the PVOL serving as a production volume for business which the server system 101 accesses. A plurality of CDP volumes 301 used in units of identical or associated services or systems constitute the CDP group 303. This is to collectively manage a plurality of volumes necessary for the identical or associated services or systems. Therefore, basically, the restoration process of the CDP volume is performed in units of CDP groups. The CDP group management table 226 manages a correspondence relation of a plurality of CDP volumes and the CDP groups. For example, the correspondence of the CDP group number of the CDP group and the CDP volume number belonging to the CDP group is managed. The CDP volume number may be information identifying the CDP volume, for example, an identifier.

The server system 101 can write data in the CDP volume 301 and read data from the CDP volume 301. The data written in the CDP volume 301 continuously leaves data through a postscript process by the CDP function by the CDP control program 213.

One CDP group 303 includes one CDP meta volume 302 which is stored and managed as journal data (JNL data) that is history information (meta information) evacuated from the CDP volume 301. In the restoration process, the CDP volume 301 is restored to a certain time point in the past using the journal stored in the CDP meta volume 302.

The CDP data volume 305 stores data which the server system 101 writes in the CDP volume 301 by the CDP control program 213, for example, user data. The CDP data volume group 304 is configured with a plurality of CDP data volumes 305, and the CDP data volume group 304 is provided for each DP pool 306, and stores all data written in all the CDP volumes in the DP pool 306. Although one CDP group is illustrated in FIG. 3, a plurality of CDP groups can be configured in the DP pool 306. The write data to the CDP volumes belonging to all the CDP groups is stored in the CDP data volume.

The DP pool is configured with the storage area of the PDEV 120 of FIG. 1. For the configuration of a plurality of virtual volumes (thin provisioning) or the normal volume from the DP pool, a well-known technique may be applied, and detailed description thereof is omitted.

A correspondence relation of the CDP volume 301 and the CDP group 303 configured with the CDP meta volume 302, a correspondence relation of the CDP group 303 and the DP pool 306, and a correspondence relation of the DP pool 306, the CDP data volume 305, and the CDP data volume group are managed by the VOL management table 221.

The data of the CDP volume 301 is stored in the CDP data volume 305. A correspondence of the logical address of the CDP volume 301 and the storage position of the CDP data volume 305 in which the actual user data is stored is managed by the address translation table 222. The address translation table 222 manages a relation of the write data of the CDP volume and the journal of the CDP meta volume 302.

In the first embodiment, one or more CDP volumes 301 can be protected as the CDP target. In other words, only one CDP volume 301 can be protected alone, or a plurality of CDP volumes 301 can be grouped into the CDP group 303 and be protected as the entire group. For example, it is possible to group a plurality of CDP volumes 301 that store data associated with each other and synchronize the protection operation based on the CDP.

<Management Information>

Next, examples of the respective tables serving as the management information stored in the CDP meta volume 302 will be described with reference to FIGS. 4 to 8.

Figure 4:
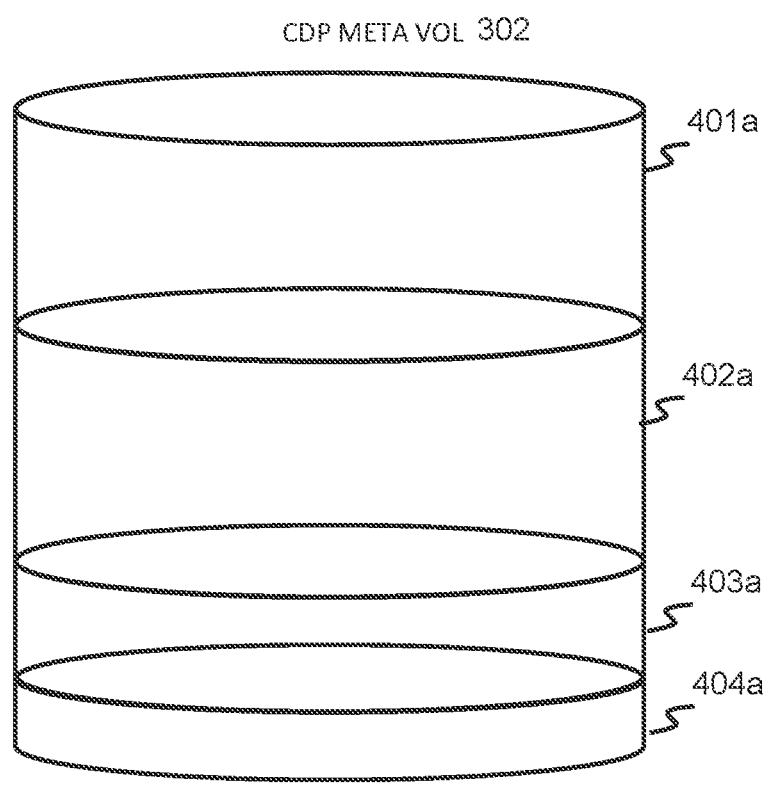
FIG. 4 is a diagram illustrating a CDP meta volume.

FIG. 4 illustrates a configuration of the CDP meta volume 302. The CDP meta volume 302 includes a JNL data management information area 401a for storing JNL data management information 401, a JNL data area 402a for storing JNL data 402, a JNL data evacuation area 403a for storing JNL data evacuation information 403, and restoration control information area 404a for storing restoration control information 404. The JNL data management information 401 and the JNL data 402 are history information of old data by the write process to the CDP volume 301. The JNL data evacuation information 403 is history information serving as data for undoing the restoration process of the CDP volume 301 based on the JNL data 402 of the CDP meta volume 302 when the process is performed. The restoration control information 404 manages history information for restoring the CDP volume 301 to the state of the restoration time. Information stored in the CDP meta volume 302 will be described with reference to FIGS. 5 to 8.

FIG. 5 illustrates the JNL data management information 401. The JNL data management information 401 manages management information for managing data evacuated from the CDP volume as the JNL data. Also, the JNL data management information 401 stores the JNL data in the JNL data management information area 401a of the CDP meta volume 302 in write units. In a case in which writing to the CDP volume 301 belonging to the CDP group 303 is performed, the management information of the old data is managed in association with an evacuation time 502 of the old data, a CDP volume number 503 of the CDP volume serving as the write destination of the write data, and a previous SEQ number 504 of the same CDP volume for each sequence number (SEQ #) 501 of the write data. The previous SEQ number 504 of the same CDP volume is a SEQ number of the write data before the CDP volume in which the old data is stored.

For example, the management is performed such that, when the SEQ #501 is "3," the evacuation time 502 is associated with "t3," the CDP volume number 503 is associated with "C," and the previous SEQ number 504 of the same CDP volume is associated with "2." An invalid value of the previous SEQ number 504 of the CDP volume indicates that there is no corresponding data, and in a case in which the SEQ #501 is "9," it indicates that the SEQ #501 of "7" is written in "A" which is the same CDP volume.

Figure 6:
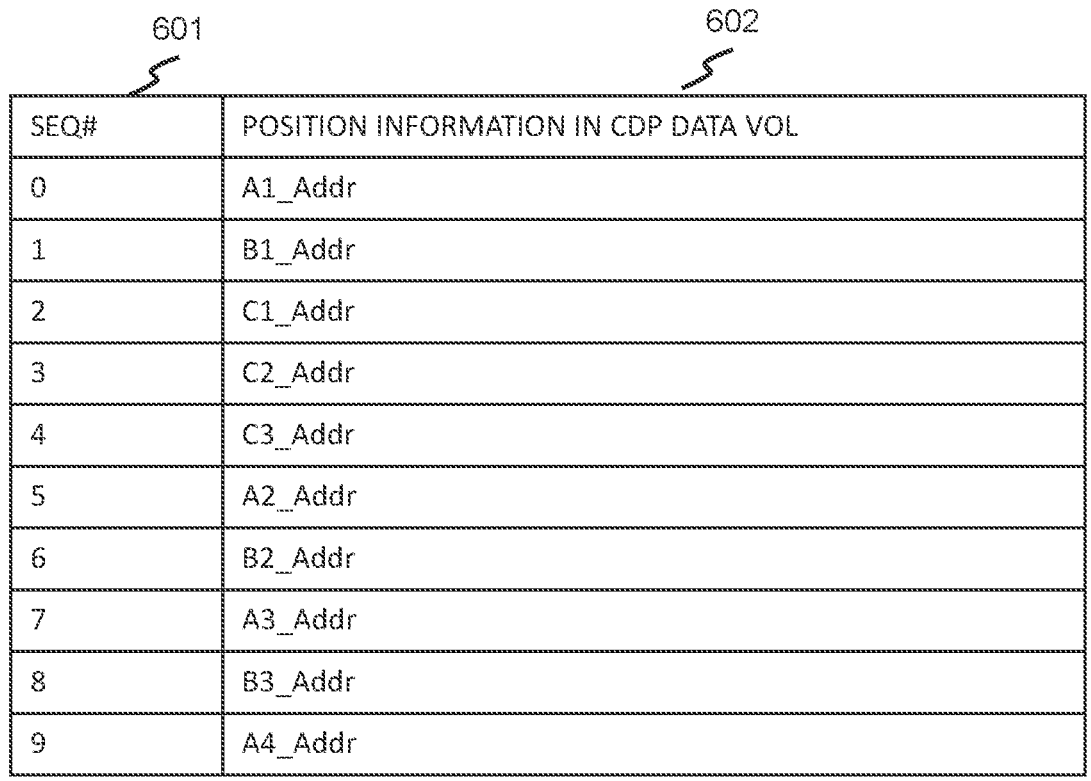
FIG. 6 is a diagram illustrating JNL data.

FIG. 6 illustrates the JNL data 402 stored in the JNL data area 402a. The JNL data 402 manages the storage position of the user data in the CDP data volume 305. Therefore, a SEQ #601 of each write is managed in association with the position information in the CDP data Vol indicating the storage position of the write data. For example, it indicates that, when the SEQ #601 is "3," "C2_Addr" is stored in position information 602 in the CDP data Vol. Note that the SEQ #501 of FIG. 5 and the SEQ #601 in FIG. 6 are the same information.

Figure 7:
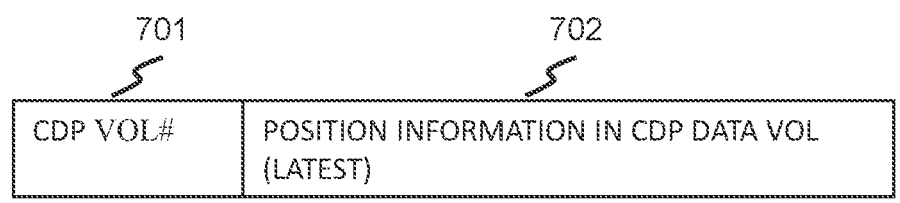
FIG. 7 is a diagram illustrating evacuation JNL data at the time of restoration.

FIG. 7 illustrates the JNL data evacuation information 403 stored in the JNL data evacuation area 403a. The JNL data evacuation information 403 manages user data position information of CDP volume 301 for each CDP volume. The JNL data evacuation information 403 becomes data for undoing the restoration process of the CDP volume 301 based on the JNL data 402 of the CDP meta volume 302 when the process is performed. By copying the metadata (history information) for Undo to the JNL data evacuation information 403 and copying the metadata data evacuation information stored in the metadata evacuation area at the time of Undo, it is possible to perform the Undo process at a high speed without searching for the JNL data. The JNL data evacuation information 403 manages position information (latest) 702 in the CDP data volume 305 for the CDP volume number 701 in units of CDP volumes serving as an Undo process target.

FIG. 8 illustrates the restoration control information 404 stored in the restoration control information area 404a. The restoration control information 404 is managed in units of the CDP volumes 301 and stores the search result for the JNL data of the restoration target. The metadata necessary to restore the data at the restoration time if the restoration time is received from the user is managed.

A method of searching for the JNL data of the restoration target will be described later, but in FIG. 8, management is performed such that a SEQ number 804 of the search result and an evacuation time 805 are associated with a CDP volume A301a, a CDP volume B301b, and a CDP volume C301c. The SEQ number 804 and the evacuation time 805 are the same information as the SEQ number 501 and the evacuation time 502 of FIG. 5, respectively.

In FIG. 8, for example, it is indicated that the JNL data for restoring the CDP volume A301a to data at the restoration time is data managed with the SEQ number 804 of "5" and the evacuation time 805 of "t5."

In the first embodiment, for the sake of simplicity, it is assumed that repetitive writing to the same logical address is performed for the same CDP volume. Therefore, information of the logical address is omitted in the JNL data management information 401 of FIG. 5 and the restoration control information 404 of FIG. 8. In order to manage the JNL data for writing to a different logical address, for example, it is desirable to add logical address information of the CDP volume to the JNL data management information 401 in addition to the CDP volume number 503 and manage the SEQ number, the evacuation time, and the like for each logical address. In this case, the previous SEQ number 504 of the same CDP volume may be the previous SEQ number for the same logical address of the same CDP volume. In this case, also in FIG. 8, the logical address information is added to each CDP volume and managed.

<Operation of CDP Control Program>

Figure 9:
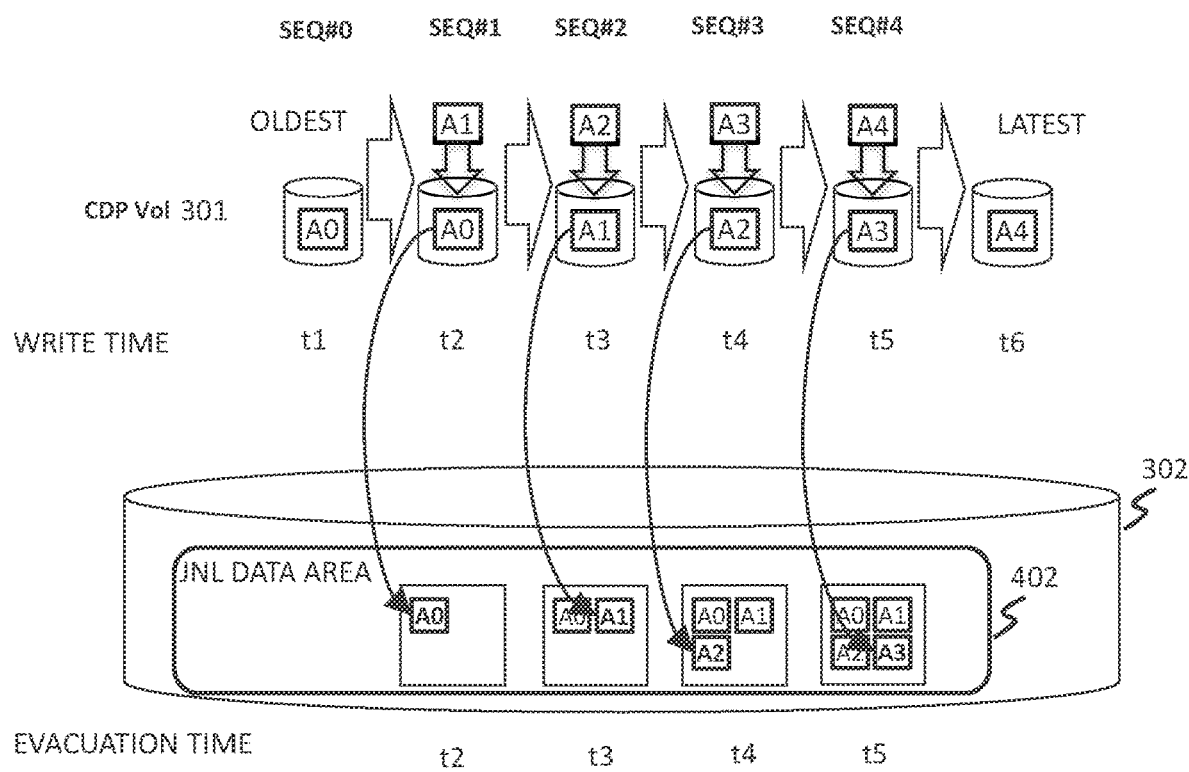
FIG. 9 is a diagram describing an old data evacuation operation to a CDP meta volume.

FIG. 9 illustrates an operation of storing the management information in the CDP meta volume 302 when data is written in the CDP volume 301 by the CDP control program 213.

As illustrated in FIG. 9, a time is indicated from the oldest t1 to the latest t6, and the CDP volume 301 at a time t1 is a state in which write data "A0" of an SEQ number 0 is stored. Then, write data "A1" of an SEQ number 1 at time t2, write data "A2" of an SEQ number 2 at a time t3, write data "A3" of an SEQ number 3 at a time t4, and write data "A4" of an SEQ number 4 is written at a time t5.

Since old data "A0" is overwritten by new data "A1" at the time t2, JNL data of the old data "A0" is stored in the JNL data area 402a of the CDP meta volume 302. In this time, the SEQ number "0," an evacuation time "t2" of the old data "A0" evacuated by writing of the write data "A1," and an "invalid value" of a previous SEQ number of the CDP volume 301 which is the same CDP volume are stored in association with the JNL data management information.

Similarly, since the old data "A1" is overwritten by new data "A2" at the time t3, JNL data of the old data "A1" is stored in the JNL data area 402a of the CDP meta volume 302. The old data "A1" and "A0" are additionally written and stored at different storage positions of the CDP data volume 305, and the storage position of the CDP data volume 305 is managed in the JNL data 402 of the CDP meta volume 302. Through the write operation of the SEQ number "2," the SEQ number "1" of the old data "A1," the evacuation time "t3" of the old data "A1" evacuated by writing of the write data "A2," and the previous SEQ number "0" of the CDP volume 301 which is the same CDP volume are stored in association with the JNL data management information.

Similarly, at other times t4 and t5, in the JNL data area 402a, immediately previous JNL data is evacuated to the JNL data area 402a at the time of writing to the CDP volume, and the SEQ number, the evacuation time, and the like are stored in the JNL data management information.

<Restoration Operation>

Figure 10:
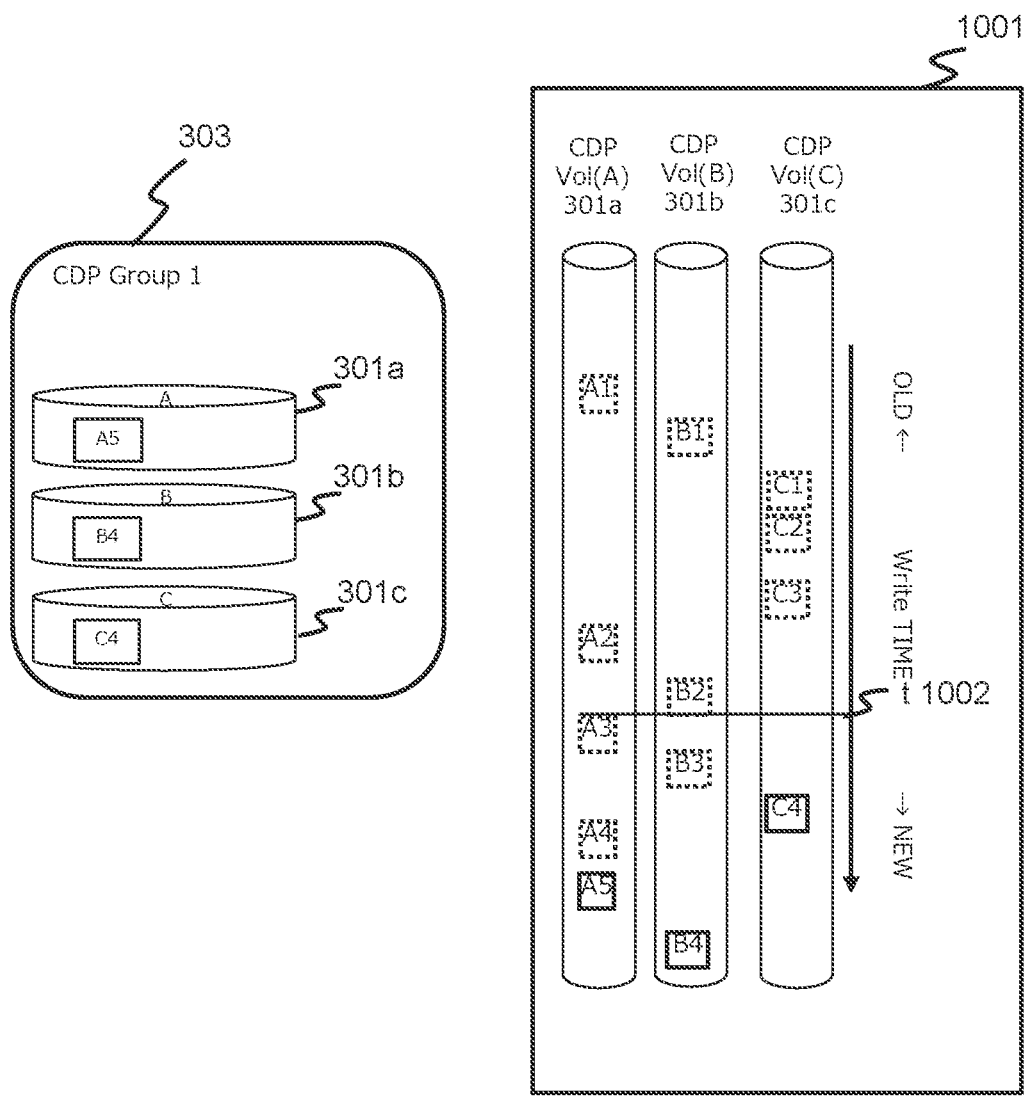
FIG. 10 is a diagram illustrating an overview of a restoration operation in a CDP group.

FIG. 10 is a diagram illustrating an overview of the restoration operation in the CDP group.

In a CDP group 1 (303) of FIG. 10, three CDP volumes, that is, a CDP volume 301a, a CDP volume 301b, and a CDP volume 301c are managed by the CDP group management table 226. It indicates a state in which currently, write data "A5" is stored in the CDP volume 301a, write data "B4" is stored in the CDP volume 301b, and write data "C4" is stored in the CDP volume 301c.

1001 of FIG. 10 indicates writing to the respective CDP volumes of the CDP group 1 in the order of time. It indicates that writing is performed in the CDP volume A301a in the order of write data "A1," "A2," "A3," "A4," and "A5," writing is performed in the CDP volume B301b in the order of write data, "B1," "B2," "B3," and "B4," and writing is performed in the CDP volume C301c in the order of "C1," "C2," "C3," and "C4." The newest data of the CDP volume A is "A5," the newest data of CDP volume B is "B4," and the newest data of CDP volume C is "C4." Note that, for the sake of simplicity, only write data at the same logical address of each CDP volume is illustrated as write data of FIG. 10.

Here, all the CDP volumes in the CDP group 1 are assumed to be restored at a certain time t1002, for example, at a time after data "B2" of the CDP volume B is written before data "A3" of the CDP volume A is written.

It is necessary to restore the CDP volume A to a state in which "A2" before write data "A3" is written, to restore the CDP volume B to a state in which data "B2" is written, and to restore the CDP volume C a state in which data "C3" is written.

Figure 11:
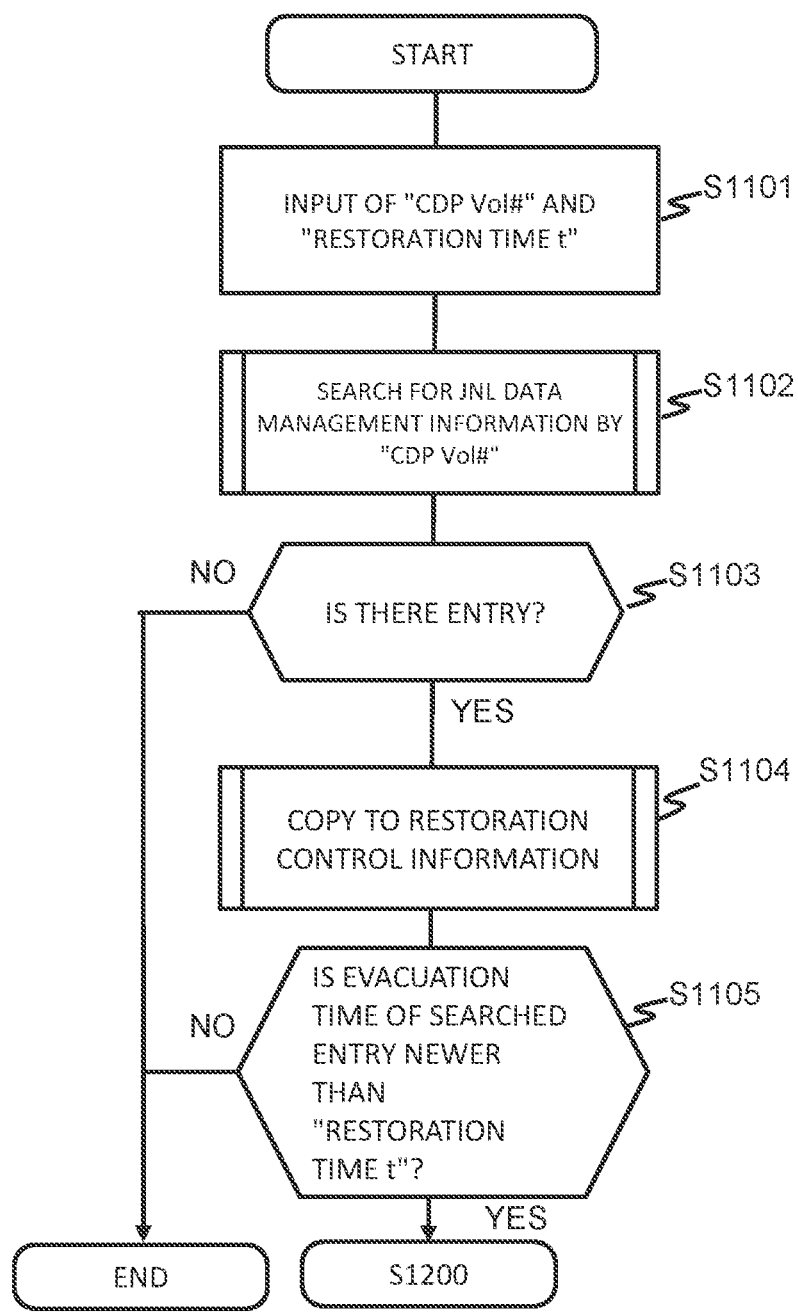
FIG. 11 is a flowchart for generating restoration control information in a CDP group.

FIG. 11 is a flowchart for generating the restoration control information of the CDP group processed by the CDP restoration program 214. AN operation of the flowchart illustrated in FIG. 11 will be described with reference to the JNL data management information 401 and the restoration control information 404 illustrated in FIG. 13 if necessary.

In step S1101, the user inputs the CDP volume number of the restoration target and the restoration time t from the management system 105 as a restoration request. In accordance with the CDP volume number, one of the CDP volumes is specified as the restoration target volume. The CDP group number to which the input CDP volume number belongs is specified from the input CDP volume number with reference to the CDP group management table 226. The input CDP volume number may be the CDP group number and is preferably information specifying the CDP group of the restoration target. Here, the description will proceed under the assumption that the CDP volume "A" is input as the CDP volume number and a time between the evacuation times t6 and t7 of the JNL data management information is input as the restoration time t.

In step S1102, the JNL data management information 401 is searched using the CDP volume number. For example, the CDP volume A of FIG. 13 is searched from the latest write data.

In step S1103, in a case in which there is an entry as a result of the search in step S1102, the process proceeds to step S1104, and otherwise, the process ends.

In step S1104, the SEQ number 501 of the entry searched from the JNL data management information 401 and the evacuation time 502 are copied to the SEQ number 804 of the CDP volume A301a of the restoration control information 404 and the evacuation time 805. For example, "9" is copied to the SEQ number 804 of CDP volume A301a of FIG. 13, and "t9" is copied to the evacuation time 805.

Figure 13:
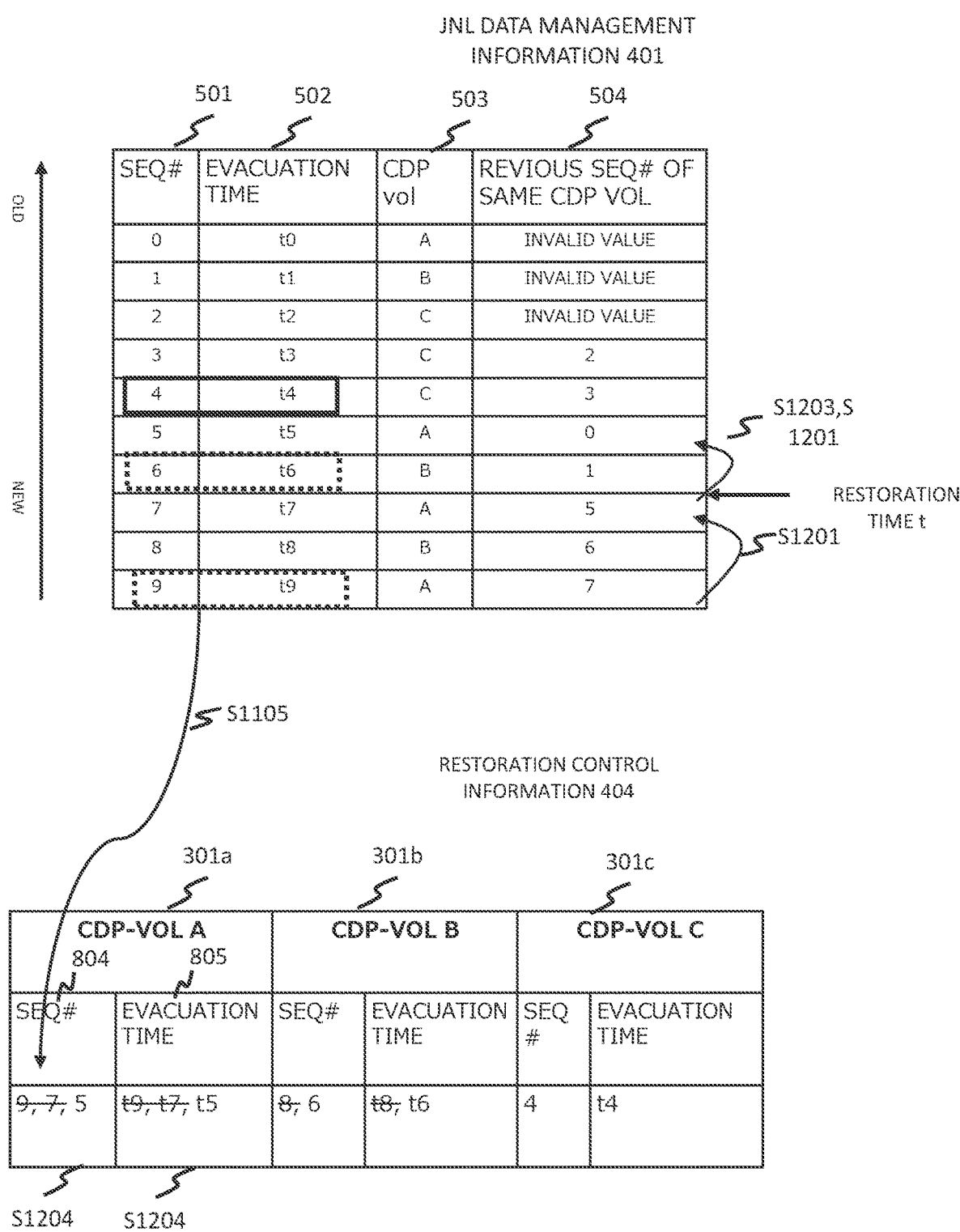
FIG. 13 is a diagram describing a generation operation of restoration control information.

In step S1105, it is determined whether or not the evacuation time of the searched history information entry is newer than the "restoration time t." For example, in FIG. 13, since the evacuation time 502 "t9" in which the SEQ number 501 of the entry searched in step S1102 is "9" is newer than the restoration time t, the determination in step S1105 becomes affirmative, and the process proceeds to step S1200.

Figure 12:
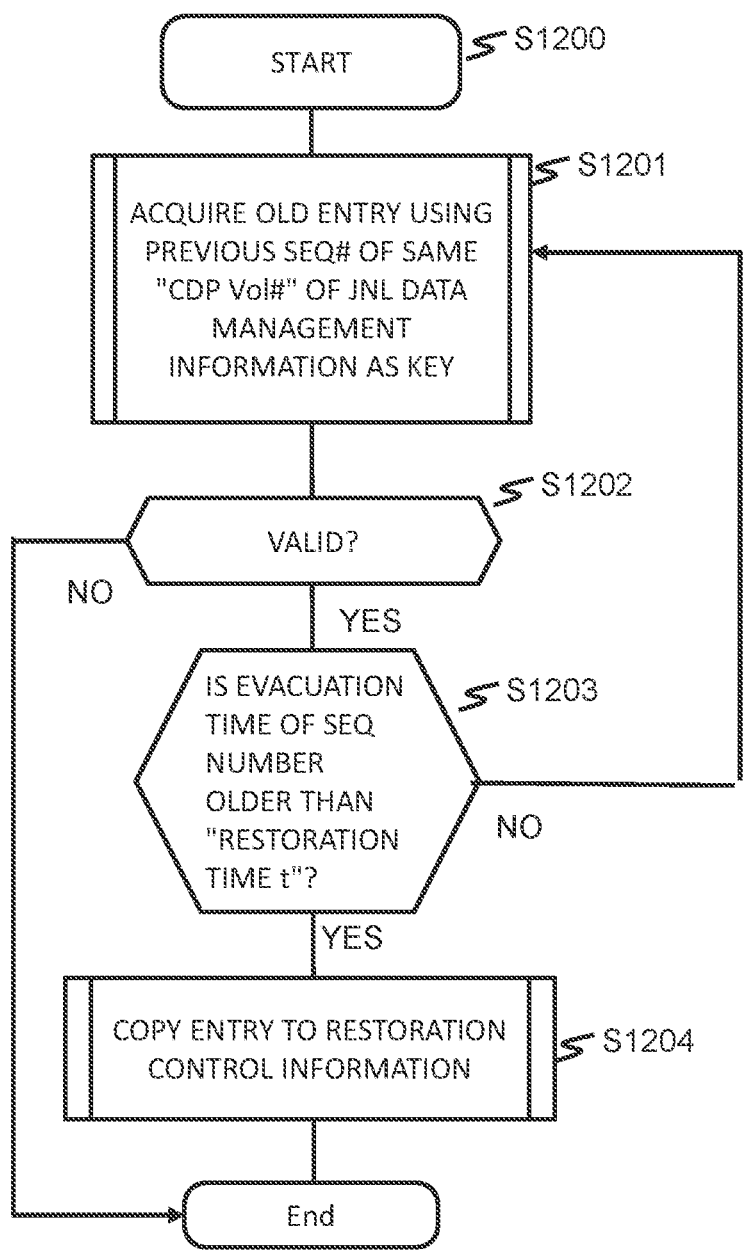
FIG. 12 is a flowchart for generating restoration control information in a CDP group.

FIG. 12 is a flowchart for generating the restoration control information of the CDP group, and is a process flow subsequent to FIG. 11.

In step S1201, if the SEQ number 804 and the evacuation time 805 are copied in step S1105 in FIG. 11, an old entry is acquired using the previous SEQ number of the same "CDP volume number" in the JNL data management information as a key. For example, currently, in the restoration control information, "9" is copied to the SEQ number 804 of CDP volume A301a, and "t9" is copied to the evacuation time 805, but the SEQ number 501 "7" is acquired as the previous SEQ number of the same CDP volume with reference to the previous SEQ number 504 of the same CDP volume A of the JNL data management information 401, and the evacuation time 502 "t7" which is an entry in which the SEQ number 501 is "7", the CDP volume number 503 "A," and the like are acquired and copied to the restoration control information.

In step S1202, it is determined whether or not the acquired previous SEQ number of the same CDP volume is valid. For example, in the example of FIG. 13, since "7" is acquired as the previous SEQ number of the same CDP volume, it is determined to be valid, and the process proceeds to step S1203. Here, in a case in which an "invalid value" is obtained as the previous SEQ number of the same CDP volume, the process ends.

In a case in which it is determined that the evacuation time of the previous SEQ number of the acquired same CDP volume is older than the restoration time t in step S1203, and the process returns to step S1201. For example, in FIG. 13, the entry corresponding to the SEQ number "5" having the older SEQ number is acquired because the evacuation time 502 of "7" of the previous SEQ number 504 of the same CDP volume is newer than the restoration time at t7. From JNL data management information 401, the evacuation time of the SEQ number "5" is "t5" which is older than the restoration time t, and thus the determination in step S1203 is YES, and the process proceeds to step S1204.

In step S1204, the history information which is the entry corresponding to the SEQ number having the latest evacuation time older than the restoration time in step S1203 is copied to the restoration control information 404. For example, in FIG. 13, in step S1203, the SEQ number "5" of the JNL data management information and the evacuation time "t5" corresponding to the sequence number "5" are copied to the SEQ number 804 of the restoration control information 404 of the CDP volume A301a and the evacuation time 805.

The processes of FIGS. 11 and 12 performed on the CDP volume A are also performed on the CDP volume B and the CDP volume C which are the other CDP volumes belonging to the same CDP group.

For example, in step S1101, the CDP volume B301b detected as belonging to the same CDP group and the restoration time are input, and in step S1102, the entry related to the CDP volume B is searched for in the JNL data management information 401.

For example, in the case of FIG. 13, since there is an entry indicated by the SEQ number "8," the process proceeds from step S1103 to step S1104, and "9" is copied to the SEQ number of the CDP volume B301b of FIG. 13, and "t8" is copied to the evacuation time. Then, in step S1105, the evacuation time of an SEQ number "8" is newer than the restoration time, and the process proceeds to step S1200.

Thereafter, the process illustrated in FIG. 12 is performed, and finally, as the restoration control information 404, "6" is copied to the SEQ number of the CDP volume B301b, and "t6" is copied to the evacuation time.

Ae similar process is performed on the CDP volume C, and as the restoration control information 404, "4" is copied to the SEQ number of the CDP volume C301c, and "t4" is copied to the evacuation time.

As described above, if the CDP volume number and the restoration time are input, the restoration control information 404 necessary for the restoration process can be generated.

Figure 14:
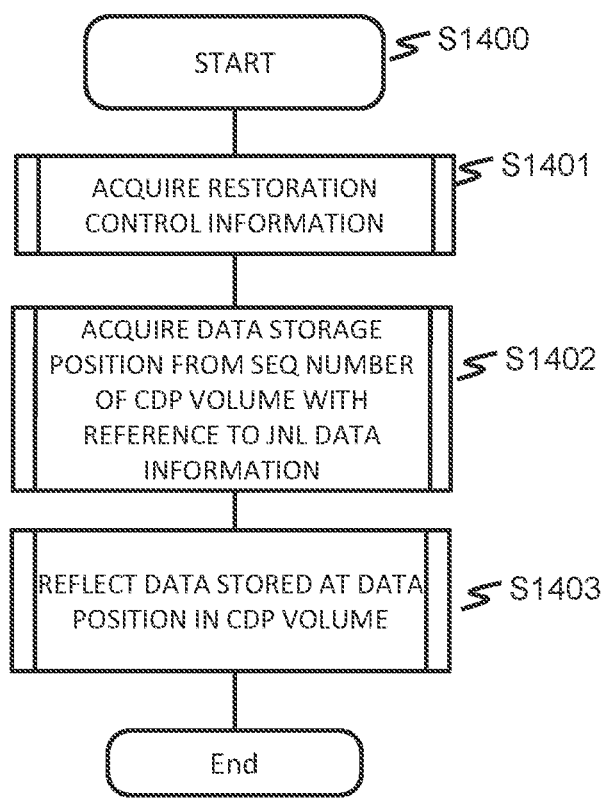
FIG. 14 is a flowchart illustrating an operation of a restoration process using restoration control information.

FIG. 14 is a flowchart illustrating an operation of the restoration process using the restoration control information which is processed by the CDP restoration program 214.

Figure 15:
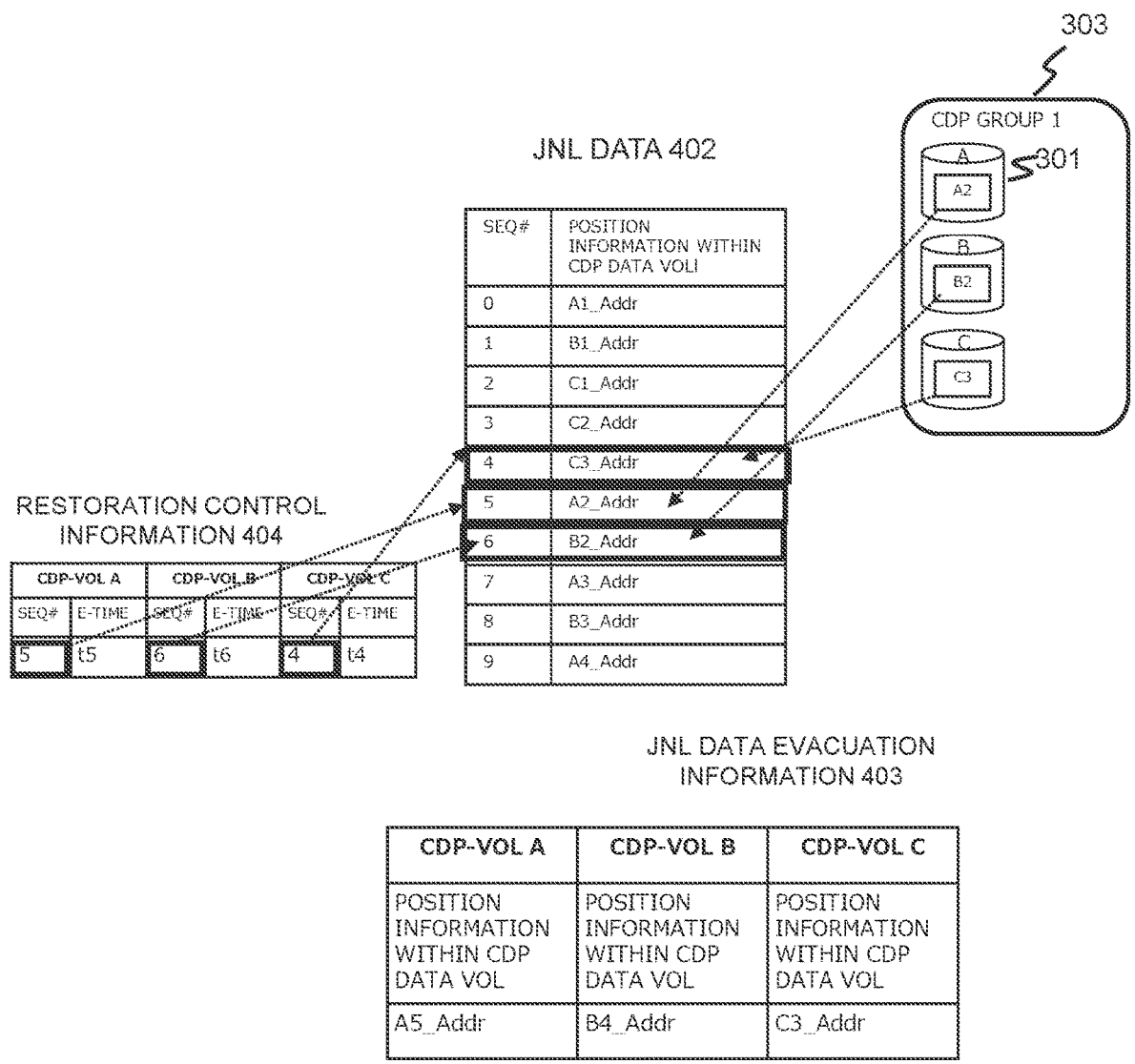
FIG. 15 is a diagram describing a restoration process using restoration control.

With the process flow illustrated in FIGS. 11 and 12, the CDP restoration program 214 generates the restoration control information 404 illustrated in FIG. 15 and stores it in the restoration control information area 404a.

In step S1401, the CDP restoration program 214 acquires the restoration control information 404 from the restoration control information area 404a.

In step S1402, the SEQ number of each CDP volume of the acquired restoration control information 404 is acquired, and the storage position of the write data in the CDP data volume 305 is acquired by the acquired SEQ number with reference to the JNL data 402 which is the history information. For example, for the CDP volume A, the SEQ number "5" is acquired from the restoration control information 404, and "A2_Addr" is acquired from the position information in the CDP data volume corresponding to the SEQ number "5" in the JNL data 402. Similarly, "B2_Addr" is acquired for the CDP volume B, and "C2_Addr" is acquired for the CDP volume C.

Then, in step S1403, it is reflected in the CDP volume using the data storage position in the CDP data volume acquired in step S1402. Specifically, the data of the CDP volume is restored by setting the reference destination of the logical address of the CDP volume as the data storage position of the CDP data volume 305 acquired in step S1402.

As described above, the restoration process of the restoration target volume is performed on the basis of the restoration control information including the SEQ number of the copied old history information.

The process of FIG. 14 can be performed on each of the CDP volumes belonging to the CDP group, and the data of a plurality of CDP volumes belonging to the CDP group can be returned to the same restoration time.

According to this process, the copy of the storage position of the data corresponding to the SEQ number managed with the restoration control information in the CDP data volume may be performed for each CDP volume only once. In other words, for the SEQ number indicating writing of a newer time than the SEQ number stored in the restoration control information, there is no need to perform the reflection process on the CDP volume, and thus the restoration process can be sped up.

As illustrated in FIG. 15, the CDP restoration program 214 reflects the write data of the SEQ number specified by the restoration control information 404 in the CDP volume 301, and stores the JNL data evacuation information 403 of the newest data into the JNL data evacuation area 403a. For example, for the CDP volume A, the data storage position "A5_Addr" of the latest new data "A5" before the restoration process in the CDP data volume 305 is evacuated as the JNL data evacuation information 403. Similarly, "B4_Addr" is evacuated for the CDP volume B, and "C3_Addr" is evacuated for the CDP volume C.

Accordingly, for example, in a case in which the restoration process is stopped on the way, the CDP volume can be returned to the latest state rapidly by setting the storage position of the newest data stored in the JNL data evacuation information 403 as the reference position of the logical address of the CDP volume.

Second Embodiment

Figure 16:
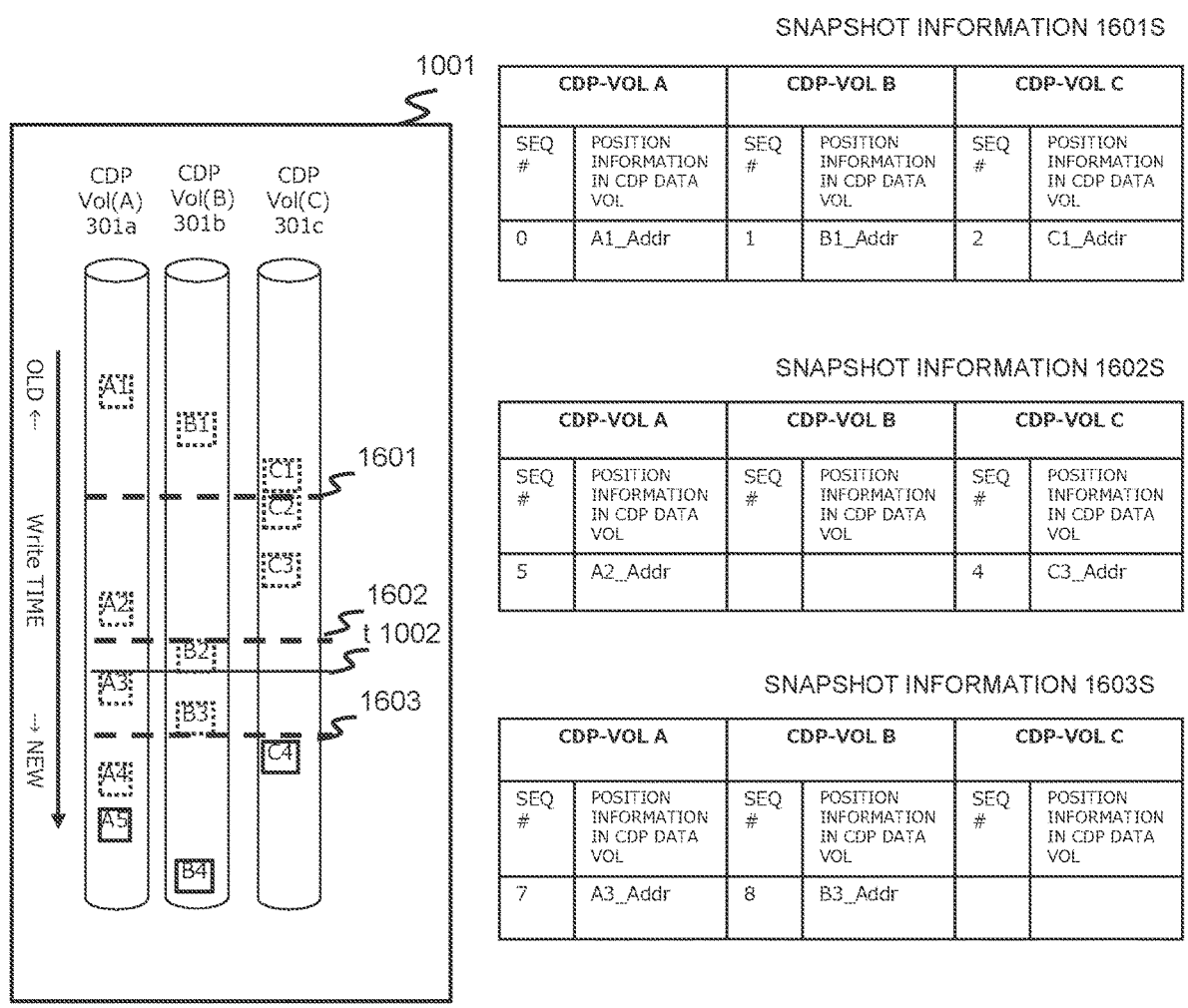
FIG. 16 is a diagram describing a restoration operation associated with a snapshot function.

FIG. 16 is a diagram describing the restoration operation associated with the snapshot function.

FIG. 16 illustrates 1001 indicating the write operation on the CDP volume 301 belonging to the CDP group chronologically. 1001 indicating the write operation chronologically is identical to that illustrated in FIG. 10.

In FIG. 16, snapshots of a plurality of CDP volumes in the same CDP group are acquired by the snapshot program 212 at different times 1601, 1602, and 1603.

The time 1603 is an acquisition time of the newest snapshot acquisition, and the time 1601 is an acquisition time of the oldest snapshot.

The snapshot at the time 1601 is in a state in which data "A1" is stored in the CDP volume A, data "B1" is stored in the CDP volume B, and data "C1" is stored in the CDP volume C. On the other hand, the snapshot at the time 1603 is a state in which data "A3" is stored in the CDP volume A, data "B3" is stored in the CDP volume B, and data "C3" is stored in the CDP volume C.

The snapshot information at each time point is stored in each CDP volume by the CDP restoration program 214 as the snapshot information together with the SEQ number and the position information in the CDP data volume, similarly to the restoration control information.

For example, in the snapshot information 1603S at the time 1603, "7" is stored as the SEQ number of the CDP volume A, and "A3_Addr" is stored as the position information in the CDP data volume. In the CDP volume C, no value is input to the SEQ number and the position information in the CDP data volume, but this is because there is no new writing from the snapshot acquired at the time 1602, and in this case, the entry of the CDP volume C of the snapshot information 1602S acquired at the time 1602 is referred to.

As described above, in the second embodiment, a plurality of snapshots are acquired, and information of each snapshot is managed as the restoration control information.

Here, if a restoration time t1002 is received for the CDP group, the CDP restoration program 214 copies the snapshot information 1603S acquired at a time newer than the restoration time t to the restoration control information 404. In other words, the snapshot information acquired immediately after the restoration time t is acquired.

The operation of copying the snapshot information 1603S to the restoration control information 404 corresponds to step S1104 in FIG. 11. Thereafter, the process of FIG. 12 is performed by the CDP restoration program 214 to generate the restoration control information of the restoration time.

As described above, as it is associated with the snapshot function, the process related to the data written after the snapshot acquisition time 1603 can be omitted, and the restoration control information can be generated at a high speed. In a case in which the restoration time is earlier than the snapshot acquisition time 1601, it is more effective because the process of searching for many journals related to writing can be omitted.

Although one embodiment has been described above, this is one example, and is not intended to limit the scope of the present invention to only this embodiment.

The present invention can be implemented in various kinds of other forms. For example, a transmission source (I/O source) of the I/O request such as the write request is the server system 101 in the above embodiment but may be a program (not illustrated) 0 (for example, an application program executed on a VM) in the storage system 10.

What is claimed is:

1. A storage system, comprising:
   a storage device; and
   a storage controller,
   wherein the storage system provides a plurality of logical volumes configured with the storage device to a server system through the storage controller,
   the storage controller
   configures a CDP meta volume that manages history information related to writing from the server system for the plurality of logical volumes and a CDP data volume that stores data of the plurality of logical volumes, searches for, if a restoration request including a restoration time is received, the restoration request having one of the plurality of volumes as a restoration target volume, history information of the restoration target volume from the CDP meta volume, copies, in a case in which an evacuation time of old data included in the searched history information of the restoration target volume is newer than the restoration time, an SEQ number of the searched history information as first restoration control information, acquires old history information on the basis of a previous SEQ number of the restoration target volume from the CDP meta volume, copies, in a case in which an evacuation time of the old history information is older than the restoration time, an SEQ number of the old history information as second restoration control information, and performs a restoration process of the restoration target volume on the basis of the second restoration control information.

2. The storage system according to claim 1, wherein the storage controller manages a CDP management table that manages a plurality of CDP volumes in which a CDP function is set among the plurality of logical volumes provided to the server system as a CDP group, and restores the plurality of the CDP volumes belonging to the CDP group to data of the same restoration time.

3. The storage system according to claim 2, wherein the CDP meta volume includes a JNL data management information area that stores JNL data management information that is the history information, and the JNL data management information manages, for each write process for the plurality of CDP volumes belonging to the CDP group, an SEQ number of write data, an evacuation time at which old data is evacuated by new write data, a CDP volume in which the old data is stored, and an SEQ number of previous write data of the CDP volume in which the old data is stored in association with one another.

4. The storage system according to claim 3, wherein the CDP meta volume includes a JNL data area that stores JNL data that is the history information, and the JNL data manages the SEQ number of the write data for the plurality of CDP volumes belonging to the CDP group and a storage position of the CDP data volume that stores the write data in association with each other.

5. The storage system according to claim 4, wherein the CDP meta volume includes a restoration control information area that stores the first restoration control information and the second restoration control information, and the restoration control information area stores a correspondence of the SEQ number of the old history information used in the restoration process and the evacuation time of the old history information managed in associated with the SEQ number of the old history information in units of CDP volumes belonging to the CDP group.

6. The storage system according to claim 5, wherein the CDP meta volume manages, when the restoration process of the CDP volume is performed on the basis of the second restoration control information, a storage position of the latest data of the CDP volume for each CDP volume as JNL data evacuation information which is data for undoing the restoration process.

7. The storage system according to claim 1, wherein the storage controller acquires a plurality of snapshots at different time points of the plurality of logical volumes, manages snapshot information for managing a correspondence of an SEQ number of each logical volume managed by the snapshot and position information in the logical volume of data corresponding to the SEQ number, and copies, if the restoration request is input, an SEQ number and an evacuation time of snapshot information of a snapshot acquired immediately after a restoration time included in the restoration request as a third restoration control information.

8. A restoration method of a storage system that includes a storage device and a storage controller and provides a plurality of logical volumes configured with the storage device to a server system through the storage controller, the restoration method comprising:

configuring, by the storage controller, a CDP meta volume that manages history information related to writing from the server system for the plurality of logical volumes and a CDP data volume that stores data of the plurality of logical volumes, searching for, by the storage controller, if a restoration request including a restoration time is received, the restoration request having one of the plurality of volumes as a restoration target volume, history information of the restoration target volume from the CDP meta volume, copying, by the storage controller, in a case in which an evacuation time of old data included in the searched history information of the restoration target volume is newer than the restoration time, an SEQ number of the searched history information as first restoration control information, acquiring, by the storage controller, old history information on the basis of a previous SEQ number of the restoration target volume from the CDP meta volume, copying, by the storage controller, in a case in which an evacuation time of the old history information is older than the restoration time, an SEQ number of the old history information as second restoration control information, and performing, by the storage controller, a restoration process of the restoration target volume on the basis of the second restoration control information.

* * * * *